(12) United States Patent
Nigro

(10) Patent No.: US 11,797,344 B2
(45) Date of Patent: *Oct. 24, 2023

(54) QUIESCENT STATE-BASED RECLAIMING STRATEGY FOR PROGRESSIVE CHUNKED QUEUE

(71) Applicant: Red Hat, Inc., Raleigh, NC (US)

(72) Inventor: Francesco Nigro, Milan (IT)

(73) Assignee: Red Hat, Inc., Raleigh, NC (US)

( * ) Notice: Subject to any disclaimer, the term of this patent is extended or adjusted under 35 U.S.C. 154(b) by 68 days.

This patent is subject to a terminal disclaimer.

(21) Appl. No.: 17/085,517

(22) Filed: Oct. 30, 2020

(65) Prior Publication Data

US 2022/0138010 A1 May 5, 2022

(51) Int. Cl.
*G06F 9/50* (2006.01)
*G06F 9/30* (2018.01)
*G06F 9/52* (2006.01)
*G06F 9/54* (2006.01)
*G06F 9/48* (2006.01)

(52) U.S. Cl.
CPC .......... *G06F 9/5016* (2013.01); *G06F 9/3004* (2013.01); *G06F 9/3009* (2013.01); *G06F 9/4806* (2013.01); *G06F 9/526* (2013.01); *G06F 9/544* (2013.01); *G06F 2209/508* (2013.01); *G06F 2209/5011* (2013.01)

(58) Field of Classification Search
None
See application file for complete search history.

(56) References Cited

U.S. PATENT DOCUMENTS

| 6,834,332 | B2 * | 12/2004 | Craddock | G06F 12/1081 |
| | | | | 711/170 |
| 7,853,627 | B2 | 12/2010 | Printezis et al. | |
| 8,074,025 | B2 * | 12/2011 | Wang | G06F 12/0261 |
| | | | | 707/813 |
| 8,190,624 | B2 | 5/2012 | Duffy et al. | |
| 9,223,638 | B2 | 12/2015 | Hudzia et al. | |
| 9,823,851 | B2 * | 11/2017 | Beale | G06F 3/0659 |
| 10,095,615 | B2 | 10/2018 | Basu et al. | |

(Continued)

OTHER PUBLICATIONS

Jeff Preshing; "Using Quiescent States to Reclaim Memory"; Powered by Octopress; Jul. 26, 2016; pp. 1-12.

(Continued)

*Primary Examiner* — Abu Zar Ghaffari
(74) *Attorney, Agent, or Firm* — K&L Gates LLP

(57) ABSTRACT

A system includes a memory for storing a plurality of memory chunks and a processor for executing a plurality of producer threads. A producer thread increases a producer sequence and determines (i) a first chunk identifier associated with the producer sequence of an identified memory chunk and (ii) a position from the producer sequence to offer an item. The producer thread determines a second chunk identifier of a last created/appended memory chunk and determines whether the second chunk identifier is valid (e.g., matches the first chunk identifier). The producer thread reads a current memory chunk and determines whether a third chunk identifier associated with the current memory chunk is valid (e.g., matches the first chunk identifier). The producer thread writes the item into the identified memory chunk at the position.

20 Claims, 10 Drawing Sheets

(56) References Cited

U.S. PATENT DOCUMENTS

| | | | | |
|---|---|---|---|---|
| 10,642,808 | B1* | 5/2020 | Kejser | G06F 16/215 |
| 2009/0216988 | A1* | 8/2009 | Palladino | G06F 12/023 |
| | | | | 711/171 |
| 2010/0199030 | A1* | 8/2010 | Dehlinger | G06F 12/0246 |
| | | | | 711/171 |
| 2013/0297877 | A1* | 11/2013 | Dennis | G06F 9/3004 |
| | | | | 711/122 |
| 2014/0149674 | A1* | 5/2014 | Solihin | G06F 12/08 |
| | | | | 711/133 |
| 2015/0026141 | A1* | 1/2015 | Blanco | G06F 16/221 |
| | | | | 707/693 |
| 2017/0344473 | A1* | 11/2017 | Gidra | G06F 12/0269 |
| 2019/0179687 | A1* | 6/2019 | Wilkinson | G06F 11/2221 |
| 2019/0237150 | A1* | 8/2019 | Jeong | G11C 16/107 |
| 2021/0208954 | A1* | 7/2021 | Stephens | G06F 9/466 |

OTHER PUBLICATIONS

Stack Overflow; "Quiescent State Based Reclamation vs Epoch Based Reclamation"; Edited Apr. 12, 2016; Accessed: Apr. 2, 2020; pp. 1-3.

Haosen Wen, et al.; "Interval-Based Memory Reclamation"; Computer Science Department, University of Rochester, NY, USA; PPoPP '18, Feb. 24-28, 2018, Vienna, Austria; ACM ISBN 978-1-4503-4982-6/18/02; 2018 Association for Computing Machinery; pp. 1-13.

Trevor Brown; "Reclaiming Memory for Lock-Free Data Structures: There has to be a Better Way" Institute of Science and Technology, Austria; arXiv:1712.01044v1 [cs.DC]; Dec. 4, 2017; pp. 1-27.

* cited by examiner

QUIESCENT STATE-BASED RECLAIMING STRATEGY FOR PROGRESSIVE CHUNKED QUEUE

BACKGROUND

Computer systems may routinely perform tasks and process work such as offer requests. For example, processors may execute instructions to read, write, and copy memory entries, according to offer requests. Tasks may typically be added to a queue and completed on a first-in-first-out ("FIFO") basis or a last-in-first-out ("LIFO") basis.

The processors may use threads to complete tasks and process work such as offer requests. Physical resources, such as a hardware thread, may be associated with a processing core. For example, there may be a single hardware thread per core on a processor. Software threads (e.g., threads created by an application or a program) may also be scheduled to perform tasks. A software thread, which may be referred to as a thread of execution (or simply a thread) is a software unit. In a multi-processor/multi-core system, multiple threads can be executed in parallel. That is, each of the processors or cores may execute a thread simultaneously. One thread can pass a request to another thread to cause the request to be executed.

SUMMARY

The present disclosure provides new and innovative systems and methods of a quiescent state-based reclaiming strategy for a progressive chunked queue. In an example, a system includes a memory configured to store a plurality of memory chunks and a processor configured to execute a plurality of producer threads. A producer thread of the plurality of producer threads is configured to increase a producer sequence and determine (i) a first chunk identifier, associated with the producer sequence, of an identified memory chunk from the plurality of memory chunks and (ii) a position, from the producer sequence, in the identified memory chunk to offer an item. The producer thread is also configured to determine a second chunk identifier of a last created/appended memory chunk and determine a first status of the second chunk identifier as one of valid or invalid. The second chunk identifier is valid if the second chunk identifier matches the first chunk identifier. Responsive to determining the first status as valid, the producer thread is configured to read a current memory chunk. Additionally, the producer thread is configured to determine a second status of a third chunk identifier associated with the current memory chunk as one of valid or invalid. The third chunk identifier is valid if the third chunk identifier matches the first chunk identifier. Responsive to determining the second status of the third chunk identifier as valid, the producer thread is configured to write the item into the identified memory chunk at the position.

In an example, a method includes increasing, by a producer thread, a producer sequence. The method also includes determining, by the producer thread, (i) a first chunk identifier, associated with the producer sequence, of an identified memory chunk from a plurality of memory chunks and (ii) a position, from the producer sequence, in the identified memory chunk to offer an item. Additionally, the producer thread determines a second chunk identifier of a last created/appended memory chunk and determines a first status of the second chunk identifier as one of valid or invalid. The second chunk identifier is valid if the second chunk identifier matches the first chunk identifier. Responsive to determining the first status as valid, the method includes reading, by the producer thread, a current memory chunk. Additionally, the producer thread determines a second status of a third chunk identifier associated with the current memory chunk as one of valid or invalid. The third chunk identifier is valid if the third chunk identifier matches the first chunk identifier. Responsive to determining the second status of the third chunk identifier as valid, the method includes writing, by the producer thread, the item into the identified memory chunk at the position.

In an example, a non-transitory machine-readable medium stores code, which when executed by at least one processor, causes a producer thread of a plurality of producer threads to increase a producer sequence, determine (i) a first chunk identifier, associated with the producer sequence, of an identified memory chunk from a plurality of memory chunks and (ii) a position, from the producer sequence, in the identified memory chunk to offer an item, and determine a second chunk identifier of a last created/appended memory chunk. The non-transitory machine-readable medium is also configured to determine a first status of the second chunk identifier as one of valid or invalid, wherein the second chunk identifier is valid if the second chunk identifier matches the first chunk identifier. Responsive to determining the first status as valid, the non-transitory machine-readable medium is configured to read a current memory chunk. Additionally, the non-transitory machine-readable medium is configured to determine a second status of a third chunk identifier associated with the current memory chunk as one of valid or invalid. The third chunk identifier is valid if the third chunk identifier matches the first chunk identifier. Responsive to determining the second status of the third chunk identifier as valid, the non-transitory machine-readable medium is configured to write by the producer thread, the item into the identified memory chunk at the position.

Additional features and advantages of the disclosed method and apparatus are described in, and will be apparent from, the following Detailed Description and the Figures. The features and advantages described herein are not all-inclusive and, in particular, many additional features and advantages will be apparent to one of ordinary skill in the art in view of the figures and description. Moreover, it should be noted that the language used in the specification has been principally selected for readability and instructional purposes, and not to limit the scope of the inventive subject matter.

DETAILED DESCRIPTION OF EXAMPLE EMBODIMENTS

Figure 1:
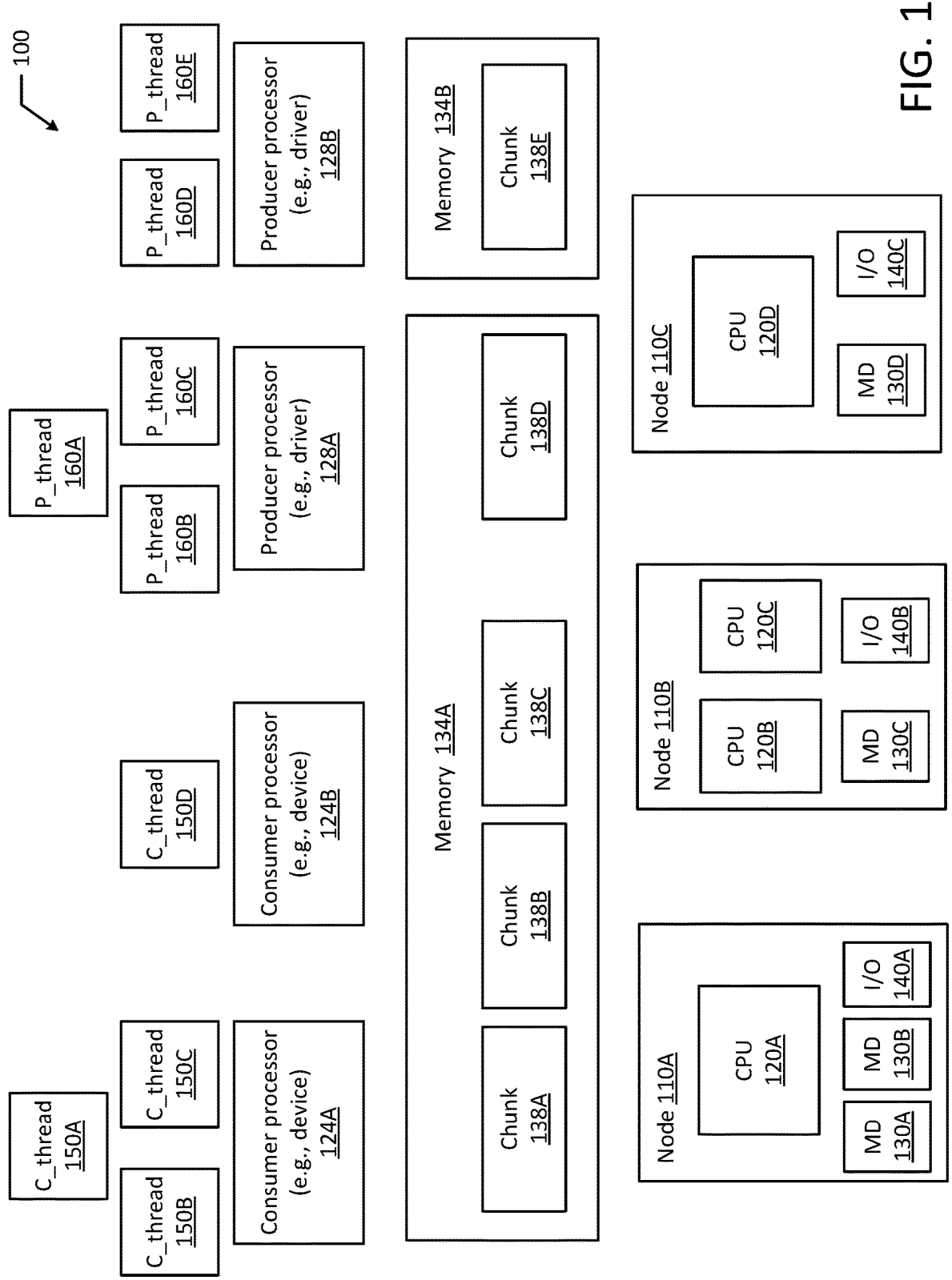
FIG. 1 illustrates a block diagram of an example computing system according to an example embodiment of the present disclosure.

Techniques are disclosed for processing offer requests, consuming items, and reclaiming memory chunks in a progressive chunked queue. The progressive chunked queue is highly-scalable for a multi-producer and single consumer configuration. For example, the disclosed systems and methods may be used to produce and consume offer requests resulting from an application or software, such as middleware that lays between an operating system (OS) and an application(s) running on the OS. An example middleware is JBoss® Enterprise Application Platform ("EAP"). Computer services (e.g., Java middleware services, Red Hat® JBoss® EAP) depend heavily on performing work (e.g., producing offer requests) from a plurality of producer threads. Additionally, a multi-tenant environment such as OpenShift (e.g., the OpenShift Container Platform) may need to interface with and submit requests from multiple worker threads to a single core thread that will execute them. The disclosed systems and methods may be used in scenarios with requests from several worker threads or producers that are executed by a single thread.

Typically, multi-producer concurrent queues are based on compare- and swap instructions, which do not scale (i.e., negatively scale) with the quantity of offering threads. For example, on the offering or producer side, concurrent unbounded queue implementations often rely on compare-and-swap ("CAS") instructions to move a producer sequence forward. Typically, the concurrent unbounded queue implementation uses a producer sequence value and an indicator on the slot where the produced item will be stored to notify a consumer(s) that something new has been added to the queue. This mechanism prevents the consumer from invaliding the producer by polling it continuously and ensures that the producer sequence is contented by other producers, which distributes the cache-misses over the produced slots in a more cache-friendly manner. If the consumer was allowed to continuously poll the producer sequence, every time the consumer checked or polled the producer sequence, the consumer may invalidate the cacheline and slow down the producer.

The concurrent unbounded queue implementations rely on CAS instructions because the instructions allows additional control (similar to that of a spin-lock) of exclusively writing the indicator per offering or producing thread while also allowing a producer to allocate new memory chunks to the queue when the queue is full. After allocating a new memory chunk, the other producers may continue to progress after the new memory chunk is allocated. A compare-and-swap ("CAS") instruction is an atomic instruction in multithreading to achieve synchronization. The CAS instruction compares the contents of a memory location with a given value and, only if they are the same, modifies the contents of that memory location to a new given value. The CAS instruction is performed as a single atomic operation, which guarantees that the new value is calculated based on up-to-date information. For example, if the value had been updated by another thread in the meantime, write the value would fail. However, multi-producer concurrent queues based on CAS instructions do not scale along with added producers and work may be wasted due to CAS failures that may cause poor system performance.

Specifically, a CAS instruction scales negatively with the quantity of threads, which prevents performance improvements for queues that have multiple threads instead of a single thread. For example, most CAS-based queues use a back-off strategy on each failed offer due to contention, which artificially increases throughput by reducing the contention, but ultimately makes latencies much worse (e.g., to avoid contention, each producer waits before performing the offer and making any progress).

To provide a highly-scalable system and prevent wasted work due to CAS failures, a progressively chunked queue may instead rely on fetch-and-add instructions, which allows the queue to scale with the quantity of producers. A fetch-and-add ("FAA") instruction atomically increments the contents of a memory location by a specified value. For example, the FAA instruction performs an operation to increment a value at an address (e.g., address_X) by an amount (e.g., amount_A) in such a way that if the operation is executed by a process in a concurrent system, no other process will see an intermediate result. The FAA instruction advantageously allows a processor to atomically increment a value in memory while preventing multiple processor collisions. Chunked queues may use a linked list of fixed size arrays or chunks and as a consumer catches up with the producer, the empty or redundant chunks may be discarded such that the overall footprint of the chunked queue decreases. However, the progressive chunked queue may also reuse empty or redundant chunks that have been consumed and may also allocate and add new chunks to the queue. In some instances, a progressive chunked queue may be unsuitable in environments that lack automatic memory management (e.g., a garbage collector).

For example, automatic memory management may dynamically tune memory components (e.g., releasing, recycling and appending new memory chunks) according to system requirements and workload changes. By coordinating the releasing, recycling and/or appending of memory chunks, automatic memory management can coordinate the producer(s) and/or consumer(s) and eliminate the risk of a producer referencing released memory chunks. Without automatic memory management, various producers may compete with each other or stalled producers may reference previously released chunks. For example, without automatic memory management, the system may lack the appropriate memory coordination between the various producers and consumers. Additionally, progressive chunked queues may lack portability to languages such as C, C++ or Rust unless the system supports and utilizes heavyweight reclaiming mechanisms such as hazard pointers or reference counting.

The progressive chunked queue disclosed herein is based on an assumption that each producer can be "left behind" spatially, which reduces the coordination efforts among them to guarantee individual progress. Unlike the CAS-based queues, the progressive chunked queue is not "just" lock-free, but instead is "mostly" wait free because it depends on whether a new memory chunk allocation takes place while offering. If a new memory chunk is needed, the offer side is lock-free although "progressive" given that any producer can make progress and add a new memory chunk instead of relying on a single producer to make progress before other producers can progress. Specifically, any of the producers may make progress and add a new memory chunk based on their ability and speed of performing their current work items. Additionally, to improve suitability in environments that lack automatic memory management, a consumer in charge of rotating a fully read buffer (e.g., memory chunk) can choose to (1) reuse the buffer (e.g., memory chunk) to save allocations of producers or (2) release the buffer. If the buffer is released, then the chunk of memory cannot be referenced or used anymore by any of the producers, which advantageously prevents a stalled producer from referencing an already released chunk. Specifically, to prevent producers from referencing an already released chunk, the systems and methods disclosed herein use a shared identifier, such as a producer chunk index or a counter to protect accesses to the producer buffer (i.e., the last chunk available to the producers to write to or reach the position to write into). As noted in more detail below, a producer buffer (e.g., "ProducerBuffer") may be a pointer to the current memory chunk where the producer offers items. Each producer (e.g., producer processor 128 or producer thread 160) may maintain its own buffer. Similarly, the consumer buffer may be a pointer to the current memory chunk where the consumer is consuming items, and each consumer (e.g., consumer processor 124 or consumer thread 150) may maintain its own buffer.

Using the assumptions above, the systems and methods disclosed herein advantageously allow for the creating of computation pipelines with much higher overall throughput and lower latencies for producer tasks. For example, initial tests indicate that on an 8-core machine with 7 producers (e.g., each producer on a different core) the system is capable of performing 5 times more operations (e.g., 40 operations per microsecond vs. 8 operations per microsecond). Additionally, the systems and methods disclosed herein are suitable for environments lacking automatic memory management (e.g., a garbage collector) and are portable to languages such as C, C++ and Rust.

FIG. 1 depicts a high-level component diagram of an example computing system 100 in accordance with one or more aspects of the present disclosure. The computing system 100 may include a memory (e.g., memory 134A-B) with a plurality of memory chunks (e.g., chunks 138A-E) and one or more processors (e.g., consumer processor(s) 124A-B and producer processor(s) 128A-B). Each processor may include one or more cores that execute various threads. For example, consumer threads (e.g., C_threads 150A-D) and producer threads (e.g., P_threads 160A-E) may execute instructions much like a software thread. In an example, the threads may be software thread, which may be created by programs or applications (e.g., applications within a virtual machine). In another example, the threads may be hardware threads. The processors (e.g., consumer processor(s) 124A-B and producer processor(s) 128A-B) may execute tasks or process offer requests using the consumer threads (e.g., C_threads 150A-D) and producer threads (e.g., P_threads 160A-E).

The threads (e.g., C_threads 150A-D and P_threads 160A-E) may be ordered sequences of instructions that allow the processors (e.g., consumer processor(s) 124A-B and producer processor(s) 128A-B) to execute multiple instruction streams simultaneously. For example, producer processor 128A may simultaneously run three instruction streams on P_threads 160A-C.

The processors (e.g., consumer processor(s) 124A-B and producer processor(s) 128A-B) may be physical processors or may be virtual processors. Virtual processors may be run within virtual machines, which may include a guest OS, guest memory, virtual memory devices ("VMD"), and virtual input/output devices ("VI/O").

Figure 2:
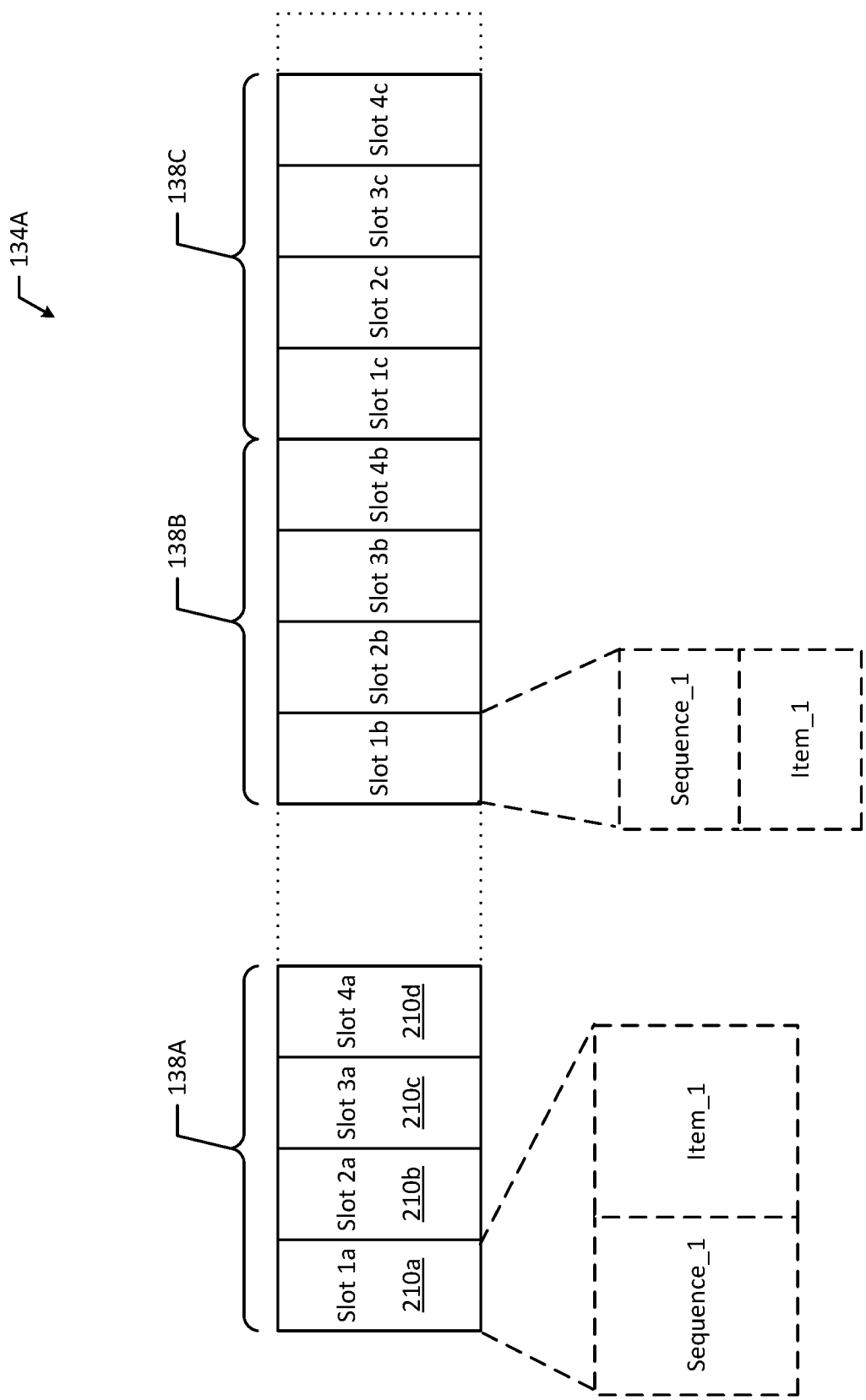
FIG. 2 illustrates a block diagram of an example pool or doubly linked list of memory chunks according to an example embodiment of the present disclosure.

The computer system 100A may include one or more nodes 110A-C. Each node 110A-C may in turn include one or more physical processors (e.g., CPU 120A-E) communicatively coupled to memory devices (e.g., MD 130A-D) and input/output devices (e.g., I/O 140A-C). Consumer processor(s) 124A-B and producer processor(s) 128A-B may be cores of CPU(s) 120A-D. Each node 110A-C may be a computer, such as a physical machine and may include a device, such as hardware device. In an example, a hardware device may include a network device (e.g., a network adapter or any other component that connects a computer to a computer network), a peripheral component interconnect (PCI) device, storage devices, disk drives, sound or video adaptors, photo/video cameras, printer devices, keyboards, displays, etc. Additionally, if the consumer processor(s) 124A-B and producer processor(s) are virtual processors (e.g., virtual CPUs), they may be provisioned on the same host or node (e.g., node 110A) or different nodes. For example, a consumer processor (e.g., consumer processor 124A) may be associated with its own respective physical processor (e.g., physical CPUs 120A of node 110A). In another example, virtual processors may be assigned to the same physical processor or CPU. Additionally, virtual processors may be assigned to different cores on the same physical processor. FIG. 2 depicts a high-level component diagram of an example portion of memory 134A, which includes memory chunks 138A-C. Each memory chunk may include a plurality of slots. For example, memory chunk 138A may include slots 210a-d (e.g., "Slot 1a", "Slot 2a", "Slot 3a", and "Slot 4a"). Each slot may be 4 bytes, 8 bytes, etc. Additionally, a memory chunk may occupy multiple cache-lines such as two cache-lines.

The memory chunks may be connected to form a continuous region of memory (e.g., memory chunks 138B and 138C). Additionally, a memory chunks may be disconnected or divided from other memory chunks in other regions of the memory 134A. For example, memory chunk 138A is disconnected from memory chunk 138B. As illustrated in FIG. 2, the plurality of slots (e.g., slots 210a-d) may be arranged in an array. Each memory chunk has a chunk size, which may be a fixed value. In the illustrated example, each memory chunk 138A-C has four slots, but memory chunks 138 may include additional slots (e.g., 6 slots, 10 slots, 32 slots, etc.). An entire memory chunk 138 may have a chunk size of 1024 bytes. In an example, a NULL value may be stored in a slot to indicate that the slot is empty or that the slot is being consumed.

As illustrated in FIG. 2, multiple memory chunks (e.g., chunk 138A-C) may create a memory pool. The memory chunks (e.g., chunk 138A-C) may be on a single memory device (e.g., MD 130A). Alternatively, the memory chunks (e.g., chunks 138A-C) may be distributed over several memory devices (e.g., MD 130A-B). A memory chunk may be referred to as an atomic chunk, which may be identified by an array of item slots with a capacity, an identifier (e.g., Chunk ID) and that points to other memory chunks. For example, the array may be defined as "AtomicChunk (chunk_id, chunk_capacity, prev: Atomic Chunk, next: AtomicChunk)." Operations that may be performed on a memory chunk (e.g., chunk 138A-C) include changing to the previous memory chunk or next memory chunk, loading a value into an index position of the array of slots belonging to the memory chunk (e.g., load(index)), and storing a value into the index position of the array of slots belonging to the memory chunk (e.g., store(index, p)).

As described in more detail below, the producer processor(s) 128A-B or associated processor threads (e.g., P_threads 160A-E) may receive offer requests to produce items such as packet addresses. A producer sequence may represent the offer identity of an offer request. Specifically, the producer sequence may represent the identity of the offer and an identifier, such as a "Chunk_ID" may represent the identity of the memory chunk associated with a specific producer sequence. For example, the producer sequence may be implemented on a 64 bit counter. A buffer may point to the current memory chunk or atomic chunk. For example, a producer buffer (e.g., "ProducerBuffer") may be a pointer to the current memory chunk where the producer offers items. Each producer (e.g., producer processor 128 or producer thread 160 may maintain its own buffer. Additionally, a counter (e.g., "ProducerChunkId") may represent an identifier of the current producer buffer. Counter operations include loading (e.g., returning the value of the counter), storing a new value for the counter (e.g., store(new value)), comparing and swapping (atomically) the value of the counter from an identified or expected value to the new value (e.g., C&S(expected, new_value)). The CAS instruction may fail if the starting value was not the identified or expected value. Additionally, the CAS instruction may fail if another producer thread (e.g., P_threads 160A-E) has successfully changed the value before the current CAS instruction completes. Additional counter operations include FAA instructions that obtain and increment (atomically) the value of the counter by a delta (e.g., F&A(delta)).

A "last created/appended memory chunk identifier" may contain information related to the "Chunk_ID" of the last appended memory chunk along with a flag or bit, which may be referred to as an "append flag", "append bit" or "append flag/bit." If the flag or bit is set (e.g., true), then an appending memory chunk operation is in progress. If the flag or bit is not set, then an appending operation is not in progress. The "last created/appended memory chunk identifier" may contain information of the last created memory chunk, which typically may be appended to the end of the current memory chunk. For example, a producer threads 160 may append a newly created memory chunk to the end of the current memory chunk, if not already done by other concurrent producers. In another example, the "last created/appended memory chunk identifier" may contain information of the last appended memory chunk, which may be a memory chunk that was previously recycled by a consumer thread 150. Thus, in some instances the last appended memory chunk may be a newly created (or last created) memory chunk or a recycled memory chunk that was last appended.

Similarly, the consumer side may have a consumer buffer (e.g., "ConsumerBuffer") and a consumer sequence ("ConsumerSequence"). The consumer buffer may be a pointer to the current memory chunk where the consumer processor(s) 124A-B or consumer threads (e.g., C_thread 150A-D) can poll the next item if the item is present. The consumer sequence may also be implemented on a 64 bit counter that represents an identifier of a consume request. A single producer and single consumer bounded queue that can hold a maximum of "N" free memory chunks may be defined as "FreeChunks (N):".

In an example configuration, each of the memory chunks may have the same chunk capacity (e.g., chunk_capacity) and the "ProducerChunkID" may be initialized at a value of "0" and the "ProducerBuffer" may be set as (ProducerBuffer=AtomicChunk (chunk_id=0, chunk_capacity, prev=NULL, next=NULL) on initialization. Additionally, the ConsumerBuffer may be set as the "ProducerBuffer" on initialization and (FreeChunk(N)= {AtomicChunk(chunk_id=-1, chunk_capacity, prev=NULL, next=NULL, . . . }.

For each slot position (e.g., slots 210a-d) in a memory chunk (e.g., memory chunk 138A) there is an epoch sequence number, which may be sized as the chunk ID (e.g., 8 bytes or 64 bits), and the epoch sequence number may be configured to indicate a state of the item the epoch sequence number refers to. A memory chunk (e.g., memory chunk 138A) with four slots may have four distinct epoch sequence values. Similarly, a memory chunk with eight slots may have eight distinct epoch sequence values. As used herein, epoch sequence values may be referred to generally as sequence values.

The sequence values may be located singularly near (e.g., before or after) each slot the sequence values refer to on the memory chunk. The location of the sequence values may use the correct alignment requirements to allow safe atomic updates and safe atomic reads of slot values or sequence values separately. For example, as illustrated in Slot 1a, each slot may have a sequence value associated with it that is positioned before the item in the sequence. As illustrated in FIG. 2, "slot 1a" may be associated with a sequence value (e.g., "Sequence_1") and an element value (e.g., "Element_1") and may store an item. Similarly, "slot 2a" may be associated with a sequence value (e.g., "Sequence_2") and an element value (e.g., "Element_2") and may store another item and so on. As mentioned above, the sequence value may also be located after item in the memory chunk 138A.

In another example, the sequence value may be packed in a separate array in the memory chunk itself. For example, the sequence value may be packed in a separate array that is separated from the portion of the memory chunk where the element values are stored. Specifically, the memory chunk (e.g., memory chunk 138B) may include a sequence value portion and an element value portion. As illustrated in FIG. 2, "slot_1b" may include a sequence portion and an element portion that indicates that "slot_1b" is associated with "Sequence_1" and "Element_1". Similarly, "slot 2b" may be associated with "Sequence_2" and "Element_2", "slot 3b" may be associated with "Sequence_3" and "Element_3", and "slot 4b" may be associated with "Sequence_4" and "Element_4".

In either of the above examples, the sequence value portion of a slot may be 8 bytes long while the element value portion of the slot may depend on the size of the item stored (e.g., 32 bits or 64 bits). In both example, a slot (e.g., slot 210a) contains the sequence value (e.g., "Sequence_1") relative to the element value (e.g., "Element_1"), which may contain the first item in the memory chunk 138A. If a memory chunk is non-recyclable, the items may be stored in slots without associating each slot with a sequence value. In other examples, the sequence value and the element value or item value may start at "0", for example, "slot 1a" may be associated with "Sequence_0" and "Element_0" or "Item_0."

The systems and methods disclosed herein advantageously prevent a stalled producer (e.g., producer processor 128 or producer thread 160) from referencing an already released chunk by using a producer chunk index or counter, such as the "last created/appended memory chunk identifier." The producer chunk index protects against unsafe accesses to the producer buffer (e.g., memory chunk 138), such as the last chunk available to the producers (e.g., producer processor(s) 128 or producer thread(s) 160) to write to. In an example, if the producer chunk index is below a safe value (e.g., below the expected chunk index for the offer), the producer thread 160 will not attempt to read a field in the producer buffer (e.g., memory chunk 138), but instead the producer thread 160 may append any missing chunks attempting a CAS instruction on the same producer chunk index. If the CAS instruction succeeds, access to the producer buffer is safe. Therefore, the producer chunk index, such as the "last created/appended memory chunk identifier," advantageously creates a quiescent state for the consumer (e.g., consumer processor 124 or consumer thread 150) to reclaim a chunk without the risk of crashing the process.

For example, the consumer may be in a quiescent state (e.g., a dormant or inactive state). The consumer may remain in a quiescent state (e.g., a dormant or inactive state) until a new or recycled memory chunk is appended and a producer writes a new item into that memory chunk. Additionally, the consumer may remain in a quiescent state (e.g., a dormant or inactive state) until the new or recycled memory chunk is appended, which prevents the consumer from prematurely freeing a chunk. The consumer may also be in an active state while consuming items from the memory chunk(s). As described herein, the consumer may reclaim a chunk without the risk of crashing the process.

The producer chunk index (e.g., the last created or appended memory chunk identifier, which may also be referred to as the last created/appended memory chunk identifier) may be incremented twice during an appending process. For example, the index may be incremented forward by one (1) when an appending process is initiated and then may be again incremented forward by one (1) when the appending process is complete. By incrementing the index forward by two (2) from start to end, the index may be divided by two (2) to indicate whether an appending process is in progress, which may indicate that accessing the memory chunk is unsafe. For example, if the index has an odd value, then another producer is currently appending a new memory chunk, which may indicate that accessing a memory chunk is unsafe (e.g., may cause an error, fault or ultimately a system crash). In another example, a flag or bit, which may be referred to as an "append flag", "append bit" or "append flag/bit," may be set (e.g., set to 1 or true) when an appending process is initiated and then rolled back or unset (e.g., set back to 0 or false) when the appending process is completed. If the flag or bit is set (e.g., true), then an appending memory chunk operation is in progress. If the flag or bit is not set, then an appending operation is not in progress.

When determining whether it is safe for a producer to access a memory chunk, the index or counter value may be obtained and divided by two (2). Then, the append flag or bit may be obtained by checking if the last created/appended memory chunk identifier is odd. A new memory chunk may be appended by first trying to increase the last created/appended memory chunk identifier by one (1), which would initially turn the last created/appended memory chunk identifier into an odd number. After the least created/appended memory chunk identifier is odd and after the producer thread finishes appending the new memory chunk, the last created/appended chunk identifier may again be increased by one (1), which turns the identifier to an even number. Therefore, whenever dividing the last created/appended chunk identifier by two, any even numbers will be divisible by two while odd numbers will result in a fraction or decimal for the identifier. A divisible chunk identifier indicates that it is safe to access because the appending process has already completed. Conversely, a bit or flag may be set and unset upon initiation and completion respectively. While one of the producers is appending a memory chunk, the other producers may be notified (e.g., by checking the index) and may wait until the appending process is complete such that only a single producer is appending a new memory chunk at once. It should be appreciated that other schemes for indicating that a producer is actively appending a new memory chunk may also be used.

If the producer thread determines that accessing the memory chunk is unsafe, the producer thread may end or pause to prevent the unsafe access from occurring. Additionally, with an odd last created/appended chunk identifier value, the producer thread 160 may wait for another producer to finish appending a new memory chunk. Each producer processor 128 or producer thread 160 may try to make progress and write items into specific slots in specific memory chunks. If a producer processor 128 or producer thread 160 is unable to move forward (e.g. make progress), the producer processor 128 or producer thread 160 may try to append another memory chunk. However, accessing a safe memory chunk before appending another is important to prevent errors, faults or system crashes. By checking the last created/appended memory chunk identifier, the producer thread 160 may advantageously determine if it can safely access a memory chunk. For example, if the producer thread 160 proceeds without making the check above, the producer thread 160 may access the wrong memory chunk.

Example operations include:

```
offer(element) {
    current_producer_seq = ProducerSequence.f&a(1);
    producer_buffer_index = current_producer_seq % chunk_capacity; //modulus operation
    producer_buffer_chunk_id = current_producer_seq / chunk_capacity; //division operation
    current_producer_buffer = ProducerBuffer;
    if (current_producer_buffer.chunk_id != producer_buffer_chunk_id) {
        current_producer_buffer = producer_buffer_of(current_producer_buffer,
    producer_buffer_chunk_id);
    }
    current_producer_buffer.store(producer_buffer_index, element);
}
where:
//walk or allocate chunks, if needed, until it get to the expected chunk id
producer_buffer_of(buffer, expected_chunk_id): AtomicChunk {
    jumps_backward = 0;
    while (true) {
        if (buffer == NULL) {
            buffer = ProducerBuffer;
        }
        chunk_id = buffer.chunk_id;
        if (chunk_id == -1) {
            //a consumer has already recycled buffer
```

```
        buffer = NULL;
        continue;
     }
     //how many chunks is necessary to walk backward from the current buffer to get to the
expected one?
     jumps_backward = chunk_id - expected_chunk_id;
     if (jumps_backward >= 0) {
        break;
     }
     //buffer cannot walk to the expected chunk id by moving forward, because
AtomicChunk.next is not stable;
     //the consumer could consume it during the chase
     //This producer thread try to allocate ANY missing chunk in order to walk backward (or
just stay still)
     if (chunk_id == ProducerChunkId) {
        //try to append the next missing one
        buffer = append_next_chunk(buffer, chunk_id);
     }
  }
  for (i = 0; i < jump_backward; i++) {
     //moving backward is fine: the consumer cannot proceed over expected chunk id
     //until the producer will occupy the buffer slot
     buffer = buffer.prev;
  }
  return buffer;
}
//try to append a new chunk or fail if others has succeeded
append_next_chunk(buffer, chunk_id): AtomicChunk {
  next_chunk_id = chunk_id + 1;
  if (!ProducerChunkIndex.c&s(chunk_id, next_chunk_id) {
     return NULL;
  }
  new_chunk = FreeChunks.poll( );
  if (new_chunk != NULL) {
     //new_chunk.chunk_id is -1
     ProducerBuffer = new_chunk;
     new_chunk.prev = buffer;
     //It makes:
     //- incoming producers able to succeed if they need to offer on next_chunk_id
     //- stalled producers to jump backward, if needed
     //- appending producers to attempt to append a new chunk
     new_chunk.chunk_id = next_chunk_id;
  } else {
     new_chunk = AtomicChunk(chunk_id = next_chunk, chunk_capacity, prev = buffer,
next = NULL);
     //It makes:
     //- incoming producers able to succeed if they need to offer on next_chunk_id
     //- stalled producers to jump backward, if needed
     //- appending producers to attempt to append a new chunk
     ProducerBuffer = new_chunk;
  }
  //it enables a consumer to finish consuming buffer (and maybe recycle it)
  buffer.next = new_chunk;
}
```

Figure 3A:
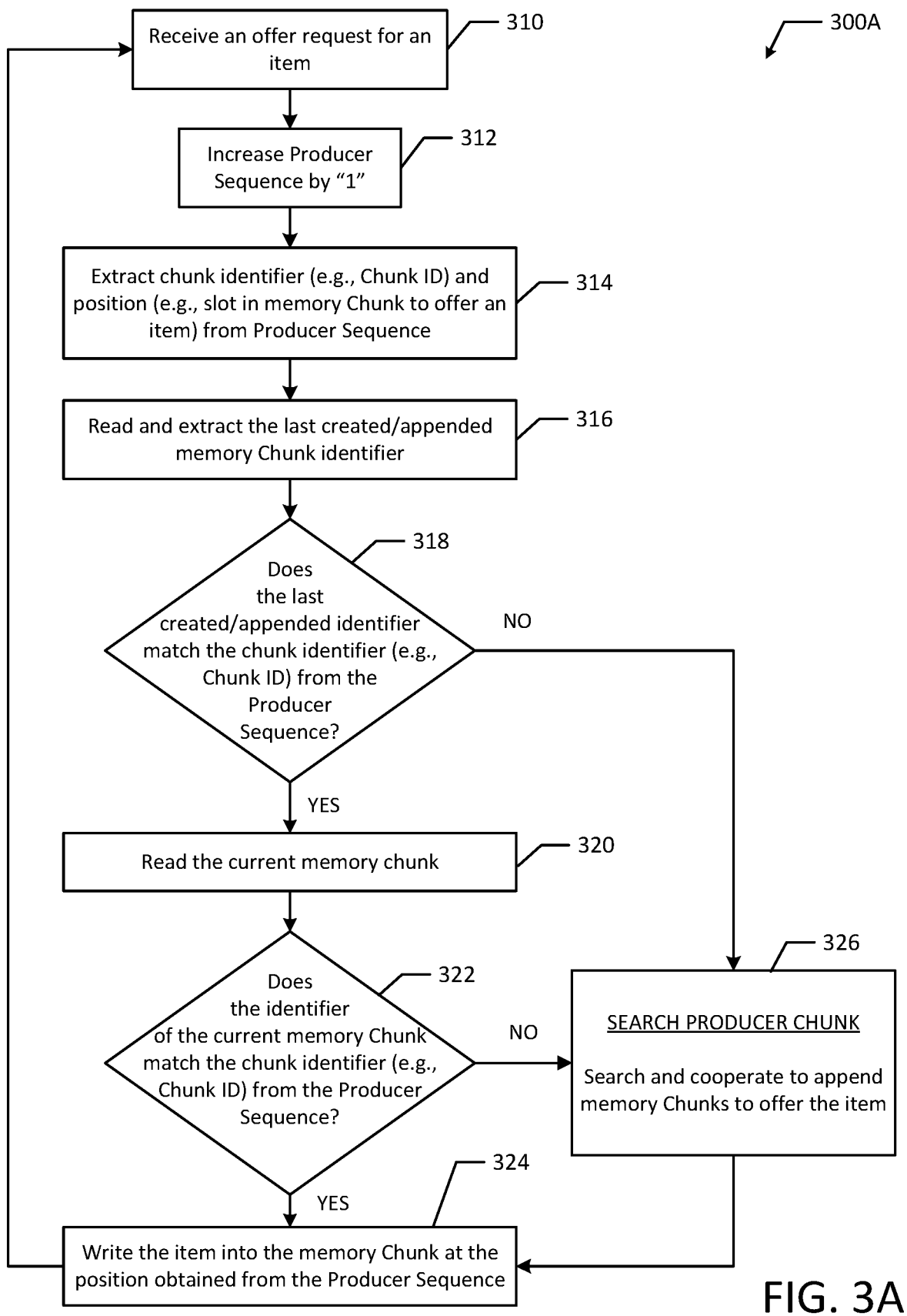
FIGS. 3A, 3B and 3C illustrate a flowchart of an example process for processing an offer request and reclaiming a memory chunk in a progressive chunked queue according to an example embodiment of the present disclosure.
Figure 3B:
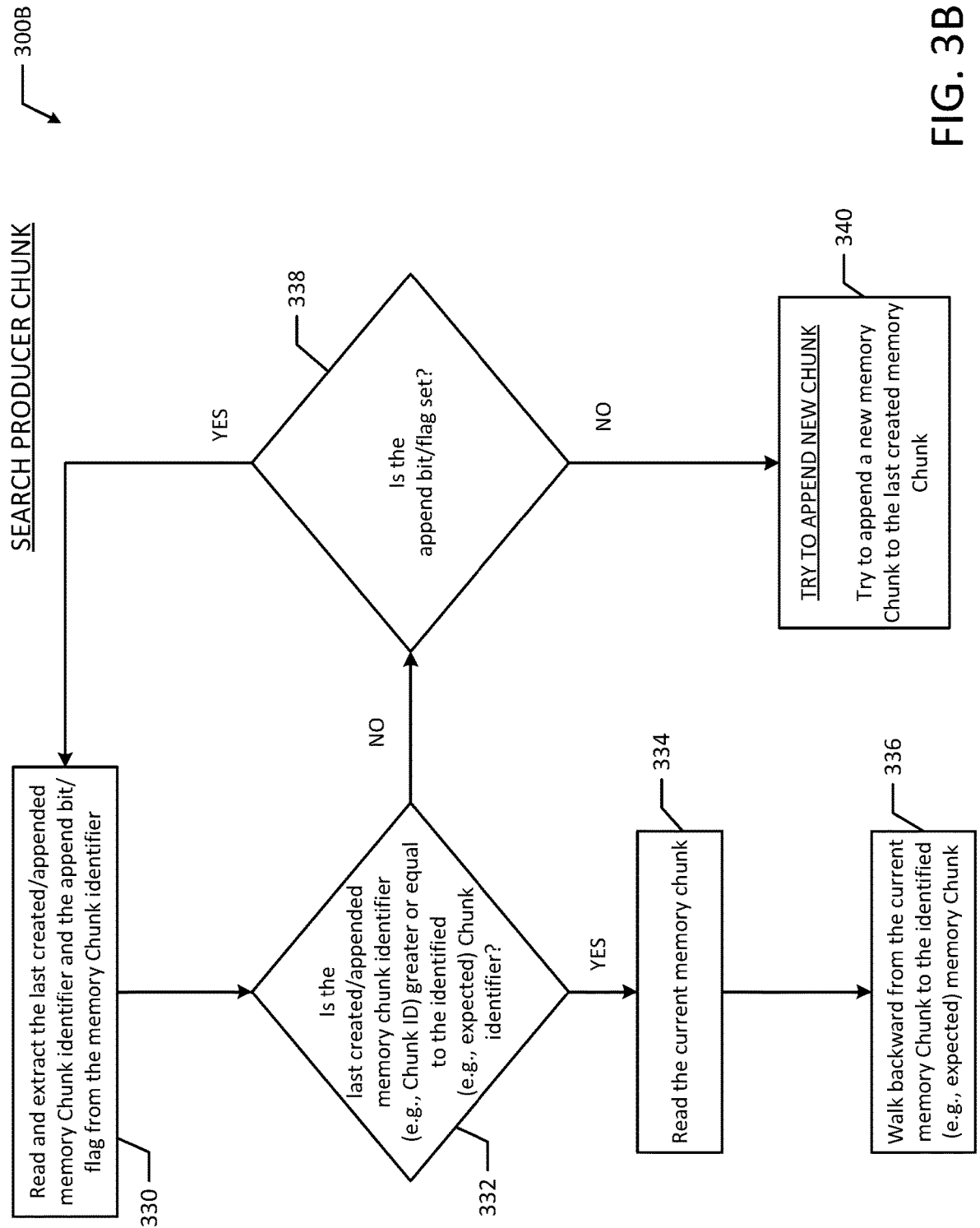
Figure 3C:
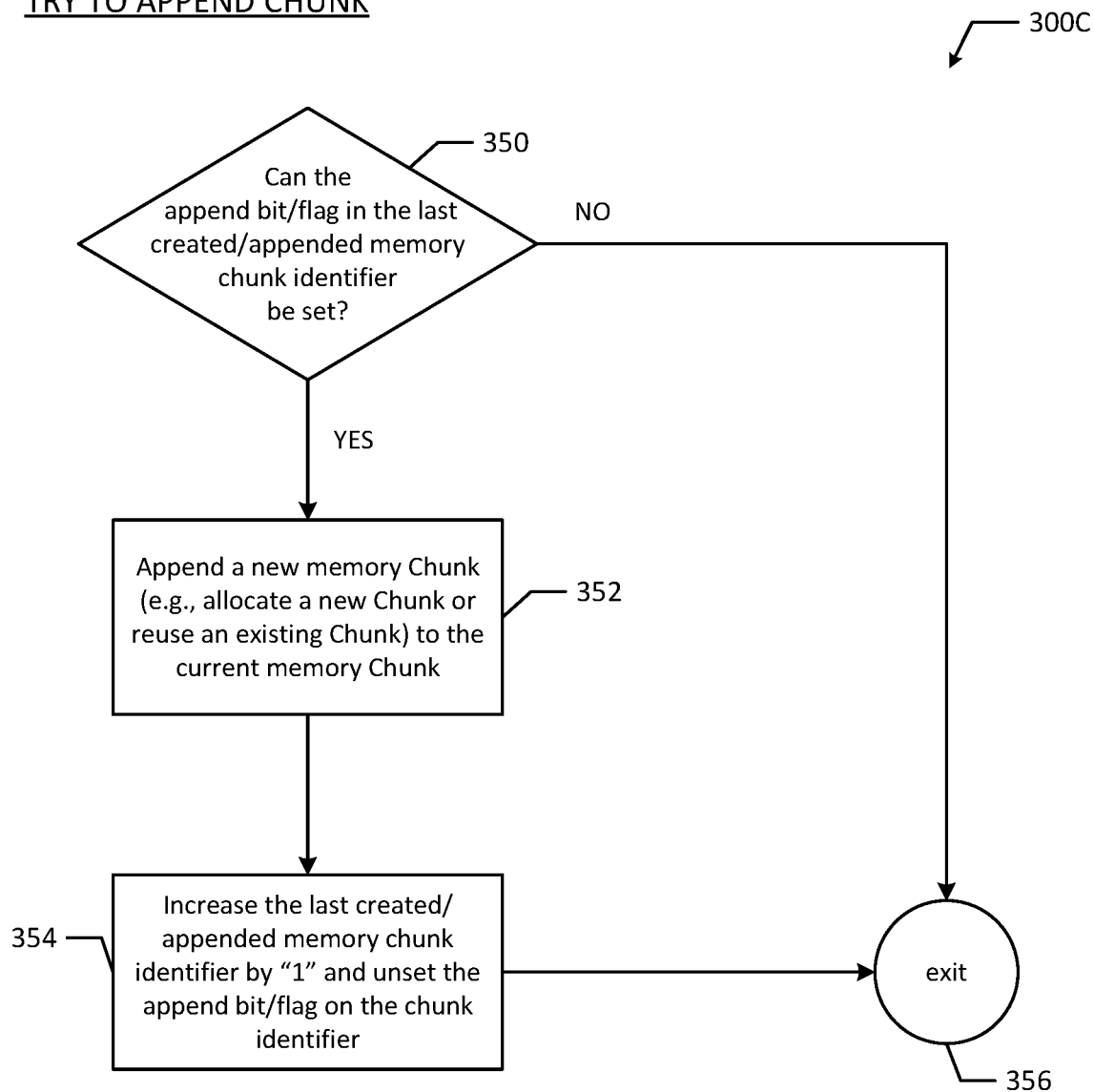

FIGS. 3A, 3B and 3C illustrate a flowchart for processing an offer request and reclaiming a memory chunk in a progressive chunked queue. As illustrated in FIG. 3A, a producer thread (e.g., producer thread 160A of producer processor 128A), hereinafter referred to generally as producer thread 160, may receive an offer request for an item (block 310). For example, the offer request may be associated with an item such as a packet address. Responsive to receiving the offer request, the producer thread 160 may increase a producer sequence by "1" (block 312). For example, the producer sequence may be a counter that identifies an offer request. The producer sequence or counters may be incremented and decremented by the producer processor(s) 128A-B or producer threads (e.g., P_threads 160A-E). Additionally, the producer sequence may be an integer, such as a 64 bit integer or counter that represents the identifier of an offer request. If the chunk size of a memory chunk (e.g., chunk 138A) is a fixed value, the chunk identifier (e.g., chunk ID) may be obtained by dividing the producer sequence by the chunk size (e.g., Chunk_ID=producer sequence/chunk size). Similarly, the offset or position in the memory chunk may be determined by the modulo operation (e.g., modulus) between the producer sequence and the chunk size.

The producer thread 160 may increase the producer sequence by a value, such as an integer value (e.g., an integer value of "1" as illustrated in FIG. 3A). Then, the producer thread 160 may extract a chunk identifier (e.g., a Chunk ID) and a position (e.g., the slot in a memory chunk 138 to offer the item) from the producer sequence (block 314).

Then, the producer thread 160 reads and extracts the last created or appended memory chunk identifier, which may also be referred to as the last created/appended memory chunk identifier (block 316). After the last created/appended memory chunk identifier is extracted, the producer thread determines whether the last created/appended identifier matches the chunk identifier (e.g., Chunk ID) from the producer sequence (block 318). If the identifiers match, the producer thread 160 may read the current memory chunk (block 320) to determine whether the identifier of the current memory chunk matches the chunk identifier (e.g., Chunk ID) obtained from the producer sequence (block 322). The determining whether the identifiers match advantageously prevents errors and faults. For example, attempting to access a memory chunk that has already been released may cause an error or a fault. If the identifier of the current memory chunk does not match the chunk identifier (e.g., Chunk ID) obtained from the producer sequence at block 322 or if the last created/appended identifier mismatches the chunk identifier (e.g., Chunk ID) from the producer sequence at block 318, the producer thread 160 may search and cooperate to append a memory chunk to offer the item (block 326), which is described in more detail in FIG. 3B. The appending memory chunk may be a new memory chunk (e.g., chunk 138D) or may be a memory chunk that was previously allocated to the pool of memory chunks (e.g., chunk 138C) or doubly linked list of memory chunks. If the identifier of the current memory chunk matches the chunk identifier (e.g., Chunk ID) obtained from the producer sequence, then the producer thread 160 may write the item into the memory chunk at the position obtained from the producer sequence (block 324). For example, the producer thread 160 may write the packet address at the identified slot position in the memory chunk. After producing or writing the packet address, the producer thread 160 may wait for another request.

FIG. 3B illustrates a flowchart of method 300B, which illustrates searching and appending a memory chunk according to block 320 of FIG. 3A. For example, when searching for a memory chunk, the producer thread may read and extract the last created or appended memory chunk identifier and an append bit or flag from the memory chunk identifier (block 330). If the memory chunk does have a valid identifier, the producer thread 160 may determine if the identifier (e.g., Chunk ID) of the current memory chunk is greater or equal to the identifier of the identified memory chunk (block 332). If the identifiers are equal, then the current memory chunk is the same memory chunk identified by the offer request.

Specifically, the producer thread 160 may determine if the identifier of the current memory chunk is greater than or equal to the identifier of the memory chunk identified in the offer request. The producer thread may read the current memory chunk (block 334) and if the identifier of the current memory chunk is greater than the identified memory chunk identifier, then the producer thread 160 may walk backwards from the current memory chunk to the identified memory chunk (block 336). For example, the producer thread 160 may walk back from a memory chunk with a "Chunk ID=2" to a memory chunk with a "Chunk ID=1." After walking backward from the current memory chunk to the identified (e.g., expected) memory chunk, the producer thread may then write the item into the memory chunk at the position identified by the producer sequence as illustrated at block 324 of FIG. 3A. If the identifier of the current memory chunk is equal to the identified memory chunk identifier, the producer thread 160 may stay stationary (e.g., walk backwards zero jumps or spots).

If the identifier (e.g., Chunk ID) of the current memory chunk is not greater than or equal to the identified chunk identifier, then the producer thread 160 may determine if the append bit or flag is set (block 338). The append bit/flag may be set to true (e.g., set to a value of 1) when an appending process is initiated by a producer processor 128 or a producer thread 160. If the append bit or flag is set, then the producer thread 160 may again attempt to read and extract the append bit/flag from the memory chunk identifier at block 330. If the append bit/flag is not set, then the producer thread 160 may try to append a new memory chunk to the last created memory chunk (e.g., the current memory chunk) (block 340), which is described in more detail in FIG. 3C. For example, after a producer has completed or finished appending a memory chunk, the append bit/flag may be unset or set to false (e.g., set back to a value of 0), which indicates that accessing the memory chunk is safe for the producer. If the producer is at the end of a memory chunk, the producer may attempt to append a new memory chunk. In order to ensure that appending a new memory chunk is successful without errors, the producer thread 160 needs to access a safe memory chunk before appending. For illustrative purposes, if memory chunk 138B was the last created memory chunk, a new memory chunk (e.g., chunk 138C) may be appended as represented in FIG. 2.

FIG. 3C illustrates a flowchart of method 300C, which illustrates trying to append a new memory chunk according to block 340 of FIG. 3B. For example, when trying to append a new memory chunk, the producer thread 160 may determine if the append bit/flag in the last created/appended memory chunk identifier can be set (block 350). The last created/appended memory chunk identifier may serve as a shared identifier that is used to determine if a new memory chunk can be appended. Similar to the producer sequence, the last created/appended memory chunk identifier may be a counter that may be incremented and decremented by the producer processor(s) 128 or producer threads 160. The counter may be accessed prior to appending a new memory chunk to determine if the appending operation can proceed without causing a fault or error. If the append bit/flag can be set, the producer thread 160 may append a new memory chunk to the current memory chunk (block 352). For example, the producer thread 160 may append a new memory chunk (e.g., allocated a new memory chunk or reuse an existing memory chunk) to the current memory chunk. Additionally, the producer thread may increase the last created/appended memory chunk identifier (e.g., chunk ID) by "1" and unset the append bit/flag on the chunk identifier (block 354).

In another example, the producer thread may increase the last created/appended memory chunk identifier by a total of "2", once when the appending process is initiated and again when the appending process is finalized. When divided by "2" provides the actual value of the last appended memory chunk. By increasing the chunk identifier by "2" and later dividing by "2", errors associated with multiple processors attempting to append a new memory chunk are advantageously avoided. For example, odd values for the last created/appended memory chunk identifier may indicate that another producer thread 160 is in process of appending a new memory chunk (e.g., the counter value lags behind the finalized value), which may indicate that it is unsafe to proceed until the append operation has finalized. Thus, the systems and methods disclosed herein advantageously prevent a waiting producer from accessing the wrong memory chunk. While waiting for the append operation to finalize, another producer thread 160, knowing that the counter value is odd, may walk back to the previous chunk to get to the last saved memory chunk.

Then the producer thread 160 may exit (block 356) and return back to the flow diagram of method 300B as illustrated in FIG. 3B. If the producer thread 160 determines that append bit/flag cannot be set, then the producer thread 160 may exit (block 356) and return back to the flow diagram of method 300B at block 330.

Figure 4:
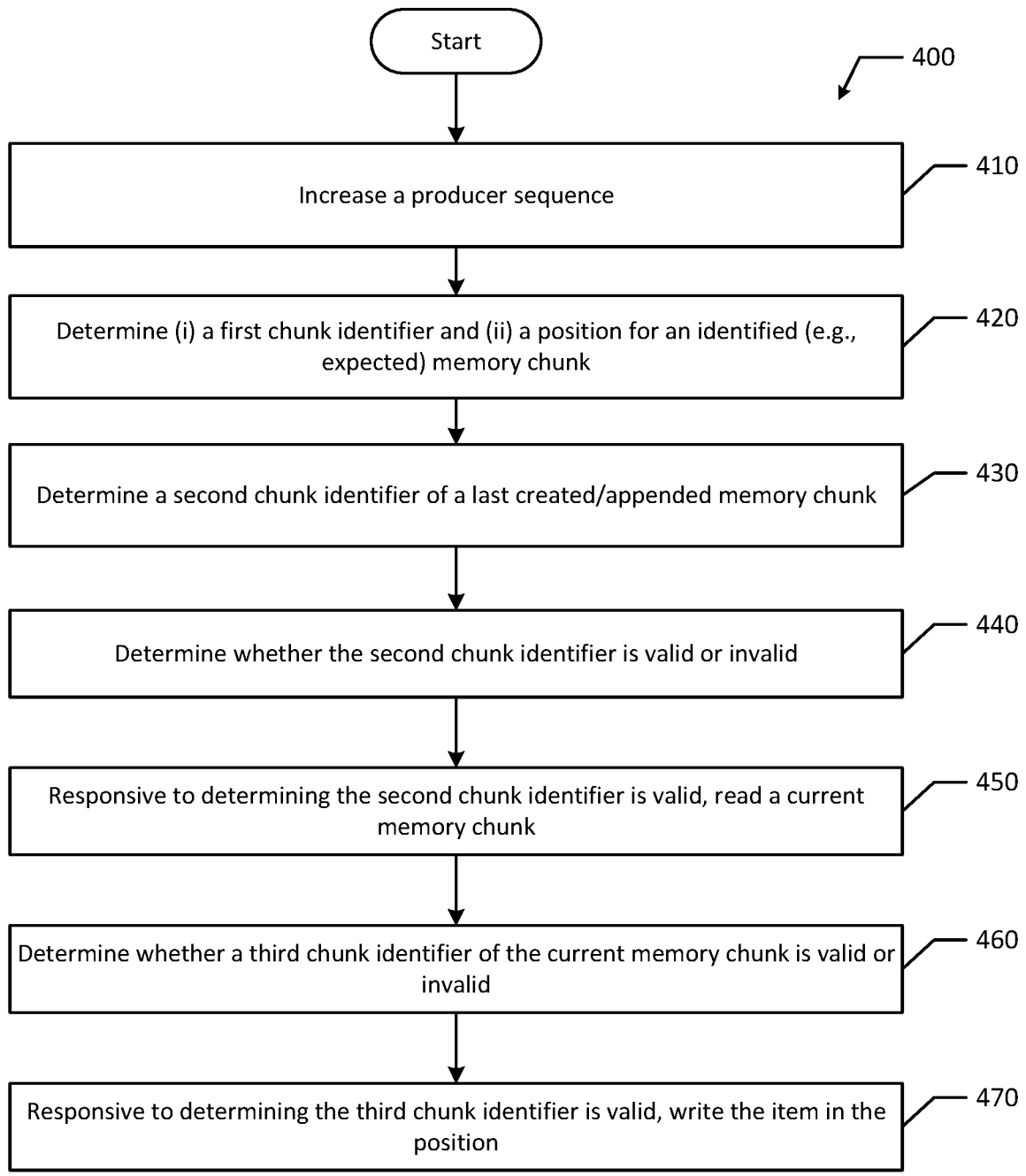
FIG. 4 illustrates a flowchart of an example process for processing an offer request in a progressive chunked queue according to an example embodiment of the present disclosure.

FIG. 4 illustrates a flowchart of an example method 400 for processing an offer request in a progressive chunked queue according to an example embodiment of the present disclosure. Although the example method 400 is described with reference to the flowchart illustrated in FIG. 4, it will be appreciated that many other methods of performing the acts associated with the method 400 may be used. For example, the order of some of the blocks may be changed, certain blocks may be combined with other blocks, and some of the blocks described are optional. The method 400 may be performed by processing logic that may comprise hardware (circuitry, dedicated logic, etc.), software, or a combination of both.

The example method 400 includes increasing a producer sequence (block 410). The producer sequence may in an integer, such as a 64-bit integer. Additionally, the producer sequence may be associated with a chunk identifier that identifies the memory chunk for the request and a position that identifies the slot for producing the item. In an example, the producer sequence may be increased after receiving an offer request associated with an item. The offer request may be received from another processor, device or program (e.g., application).

Next, the method 400 includes determining (i) a first chunk identifier and (ii) a position for an identified (e.g., expected) memory chunk (block 420). For example, the producer thread 160 may extract the chunk identifier and position from the producer sequence in the producer sequence to offer an item. As discussed above, the producer thread may receive a request associated with the item from another processor, device or program (e.g., application). Then, the method 400 includes determining a second chunk identifier of a last created/appended memory chunk (block 430). Then, the method 400 includes determining whether the second chunk identifier is valid or invalid (block 440). For example, the producer thread 160 may determine a first status of the second chunk identifier as valid or invalid. The second chunk identifier of the last created/appended memory chunk is valid if it matches the first chunk identifier associated with the producer sequence. In an example, a valid identifier may identify a memory chunk that is part of the memory chunk pool. For example, an identifier that identifies memory chunk 138E may be invalid for a memory chunk pool that includes memory chunks 138A-D.

Responsive to determining that the second chunk identifier is valid, the method 400 includes reading a current memory chunk (block 450). For example, the producer thread 160 may read the current memory chunk. Additionally, the method 500 includes determining whether a third chunk identifier of the current memory chunk is valid or invalid (block 460). For example, the producer thread 160 may determine a second status of the third chunk identifier associated with the current memory chunk as either valid or invalid. The third chunk identifier is valid if it matches the first chunk identifier associated with the producer sequence.

Responsive to determining the second status of the third chunk identifier as valid, the method 400 includes writing the item into the position (block 470). For example, if the third chunk identifier is valid (e.g., the memory chunk matches the current memory chunk), then the producer thread 160 may write the item (e.g., packet address) at the position (e.g., slot position) determined at block 420.

If the item is not initially written into the identified memory chunk, after reading the current memory chunk, the method 400 may include either appending a new memory chunk to the current memory chunk or walking backward from the current memory chunk to the identified (e.g., expected) memory chunk. Appending a new memory chunk may be a newly allocated memory chunk. For illustrative purposes, memory chunk 138D may be allocated to an existing memory chunk pool or doubly linked list that includes memory chunks 138A-C such that the pool now includes memory chunks 138A-D. Alternatively, appending a new memory chunk may include reusing a pooled memory chunk. For example, each slot in memory chunk 138A may have been entirely consumed and is ready for reuse. In that instance, the memory chunk 138A may be rotated and reused. The pool or doubly linked list of memory chunks forms an unbounded queue due to the ability of the producer thread 160 to append new memory chunks to the current memory chunk that represent the tail of the doubly linked list.

The producer thread 160 may also walk between memory chunks, for example walk backwards from memory chunk 138C to memory chunk 138B. As discussed above, the producer thread 160 may walk backward from the current memory chunk to the identified memory chunk.

Figure 5:
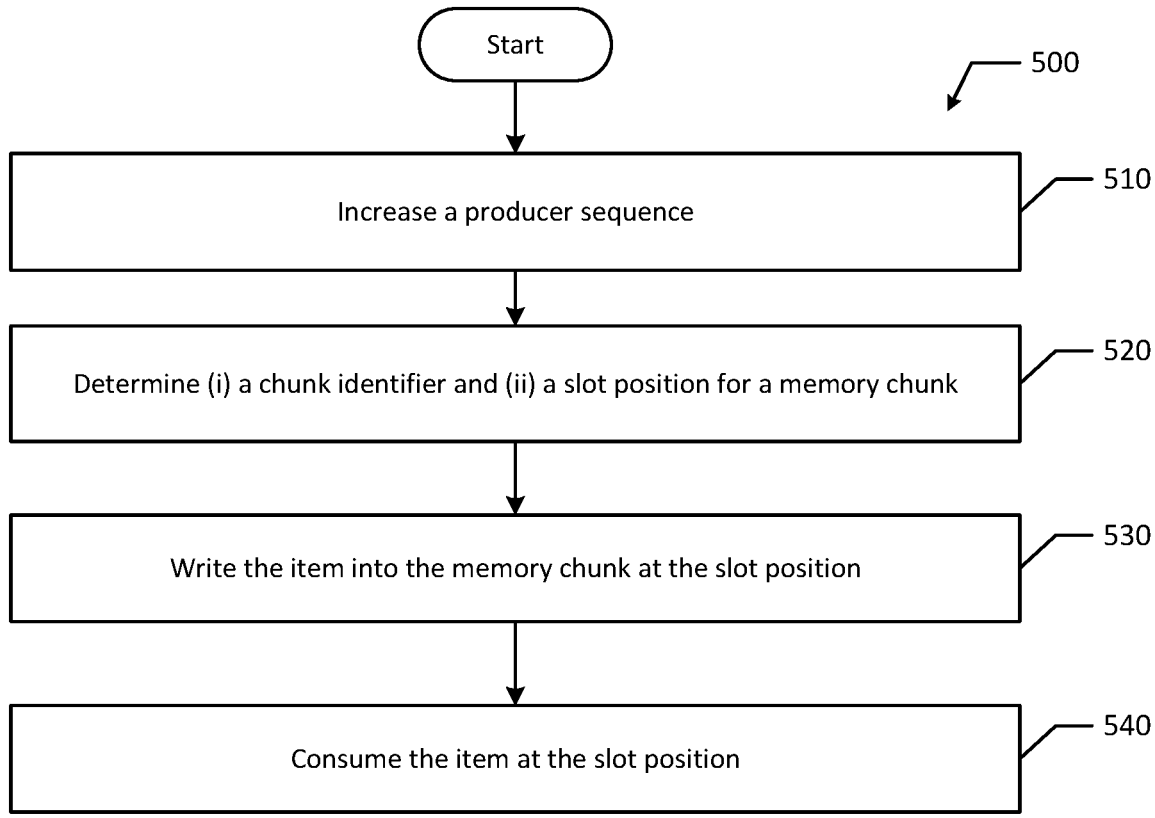
FIG. 5 illustrates a flowchart of an example process for consuming an item in a progressive chunked queue according to an example embodiment of the present disclosure.

FIG. 5 illustrates a flowchart of an example method 500 for consuming an item in a progressive chunked queue according to an example embodiment of the present disclosure. Although the example method 500 is described with reference to the flowchart illustrated in FIG. 5, it will be appreciated that many other methods of performing the acts associated with the method 500 may be used. For example, the order of some of the blocks may be changed, certain blocks may be combined with other blocks, and some of the blocks described are optional. The method 500 may be performed by processing logic that may comprise hardware (circuitry, dedicated logic, etc.), software, or a combination of both.

The example method 500 includes increasing a producer sequence (block 510), as similarly described above at block 410 in method 400. In an example, the producer thread 160 may receive an offer request associated with an item prior to increasing the producer sequence. Next, the method 500 includes determining (i) a chunk identifier and (ii) a position for an identified (e.g., expected) memory chunk (block 520), as similarly described above at block 420 in method 400. Then, the method 500 includes writing the item into the memory chunk at the slot position (block 530), as similarly described at block 470 in method 400.

Method 500 also includes consuming the item at the slot position (block 540). For example, a consumer thread (e.g., C_thread 150D, hereinafter referred to generally as consumer thread 150) of a consumer processor 124B may determine that the item was produced at the slot position by using an item or message indicator. After determining that the item was newly produced, the consumer thread 150 may consume the item (e.g., read and copy the packet address). After consuming the item, the consumer thread 150 may overwrite the slot with a NULL value to indicate that the slot is empty. The consumer thread 150 may continue to consume items in a memory chunk until each of the items or messages in the memory chunk are consumed. The consumer thread 150 may also periodically poll a memory chunk to determine if the memory chunk is empty, which advantageously allows the consumer thread 150 to recognize when the memory chunk or pool of memory chunks (e.g., doubly linked list of memory chunks forming the unbounded queue) is empty. If the consumer thread 150 determines that the memory chunk or queue is empty, the systems and methods herein may employ parking strategies on the consumer processor(s) 124A-B or consumer threads 150A-D to save resources. For example, the consumer processor(s) 124A-B or consumer threads 150A-D may be parked such that the thread is blocked while waiting on something else to happen. Additionally, the consumer threads may be paused or may temporarily sleep to save resources while the queue is empty before being unparked.

In another example, the consumer thread 150 may determine whether the slot position is an end slot. For example, if the slot is an end slot and each slot was consumed in order, then the consumer thread 150 may determine that the memory chunk has been fully consumed (e.g., each slot is now empty). The consumer thread 150 may also detach the memory chunk. For example, to provide similar cache-friendly advantages of CAS-based queues that re-use the same chunk of memory, the progressive chunked queue allows the consumer processor 124A-B or the consumer thread 150 to recycle an unused memory chunk. Specifically, when the consumer thread 150 arrives at the end of a memory chunk, the consumer thread 150 may detach the consumed memory chunk so that it can be recycled. For example, when a producer thread 160 requests a new memory chunk, the consumer thread 150 may recycle an empty memory chunk.

In an example with chunk size 4, where the producer sequence is at "5", the producer thread 160 may be unable to produce items by walking forward from the memory chunk associated with the producer sequence "1" or "0" because memory chunks prior to the memory chunk associated with producer sequence "5" are untrusted on the producer side. The producer thread 160 may not know how much progress the consumer thread 150 has made in the previous memory chunks and therefore cannot trust those memory chunks. However, the consumer thread 150 progresses based on newly produced items and consumes items in order. When the consumer thread 150 reaches the end of a memory chunk, the consumer thread 150 knows the memory chunk is empty and that it can be recycled for re-use. If the consumer thread 150 does not recycle the memory chunk, the producer threads 160 will treat the memory chunk as untrusted since it may still be full or partially full with unconsumed items.

Once the consumer thread 150 confirms the memory chunk is empty and recycles the memory chunk, the producer threads 160 may try to append it to the end of the current memory chunk, if not already done by other concurrent producers. In another example, the memory chunk may be recycled and others concurrent producers have already appended new memory chunks next to the one needed by the producer sequence "5": the producer thread 160 may walk or move backward into the recycled memory chunk.

Figure 6A:
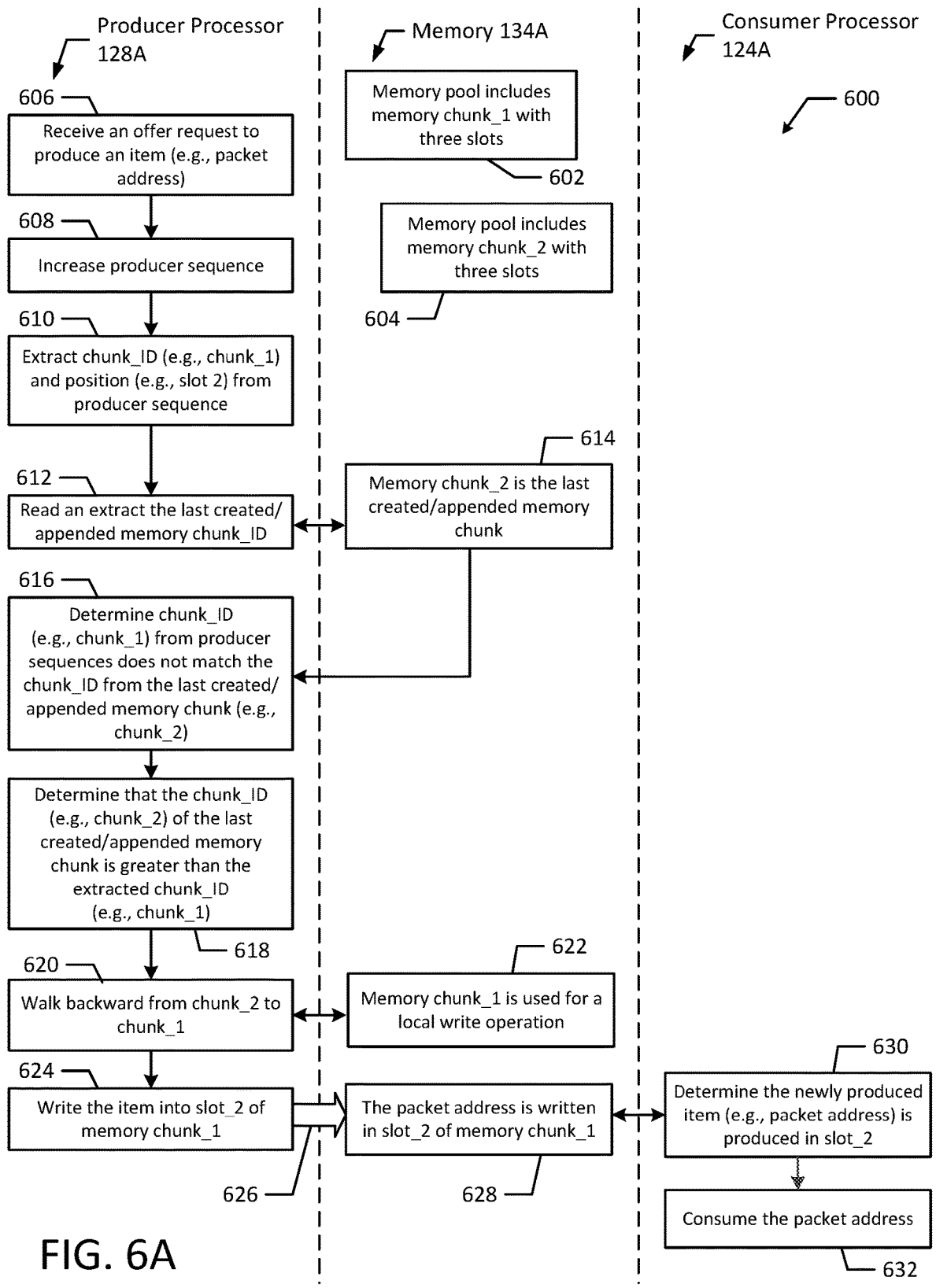
FIGS. 6A and 6B illustrate a flow diagram of an example process for processing and consuming offer requests in a progressive chunked queue according to an example embodiment of the present disclosure.
Figure 6B:
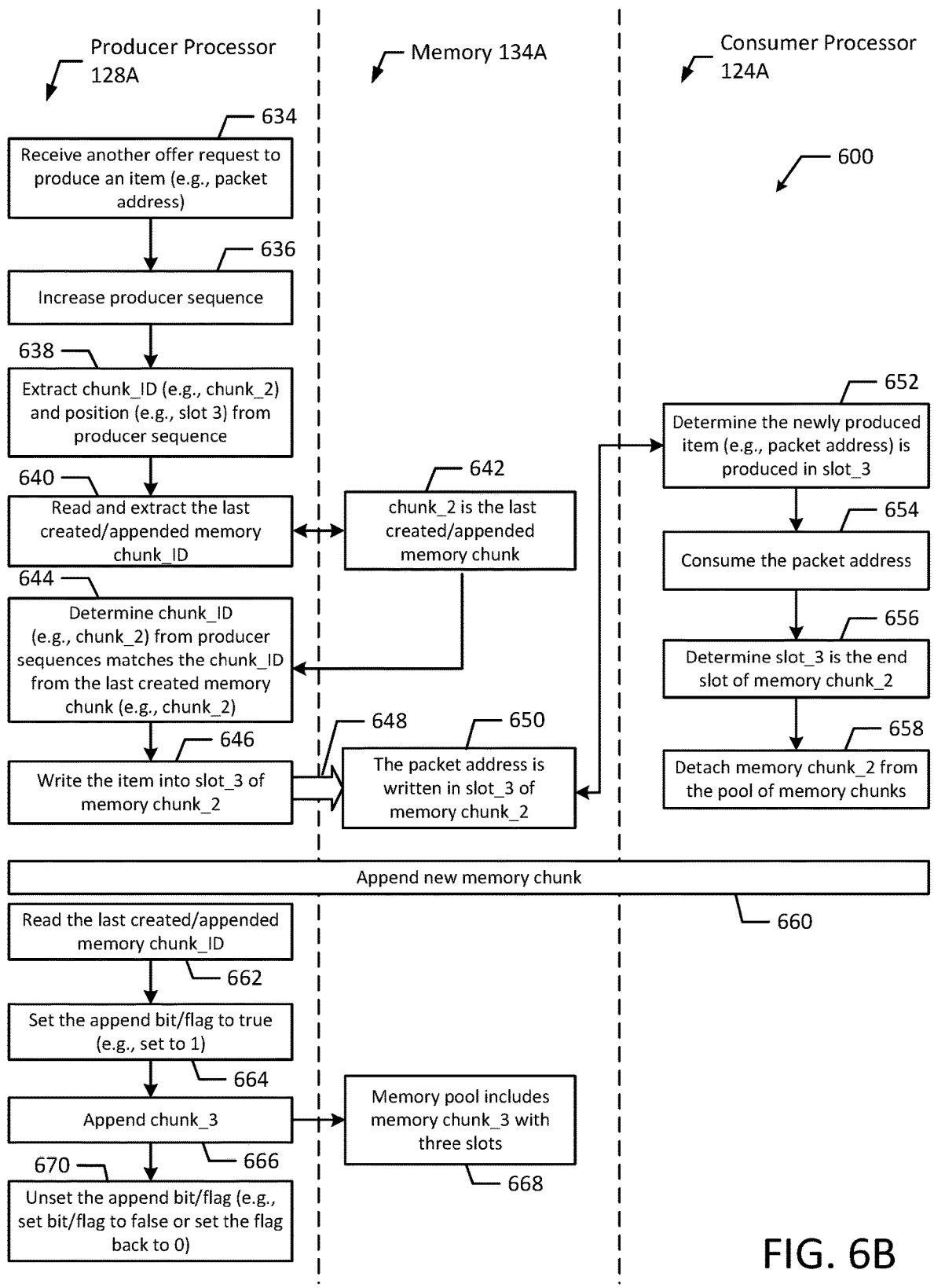

FIGS. 6A and 6B illustrate a flowchart of an example method 600 for processing and consuming offer requests in a progressive chunked queue in accordance with an example embodiment of the present disclosure. Although the example method 600 is described with reference to the flowchart illustrated in FIGS. 6A and 6B, it will be appreciated that many other methods of performing the acts associated with the method 600 may be used. For example, the order of some of the blocks may be changed, certain blocks may be combined with other blocks, and some of the blocks described are optional. For example, a producer processor 128A and a consumer processor 124A may communicate with memory 134A to perform example method 600.

In the illustrated example, the memory 134A or memory pool includes "memory chunk_1" (e.g., chunk 138A) with three slots (block 602) and "memory chunk_2" (e.g., chunk 138B) with three slots (block 604). Each slot may be 4 bytes, 8 bytes, etc. Additionally, a memory chunk may occupy multiple cache-lines such as two cache-lines. Typically, memory chunks that occupy more cache-lines result in less memory chunk rotations or CAS instructions. The producer processor 128A receives an offer request to produce an item (e.g., a packet address) (block 606). For example, a producer thread 160 of the producer processor 128A may receive an offer request to produce an item or message. After receiving the offer request, the producer processor 128A increases a producer sequence (block 608). The producer thread 160 may increase the producer sequence or producer counter.

Then, the producer processor 128A extracts a chunk ID (e.g., "chunk 1") and a position (e.g., "slot 2") from the producer sequence (block 610). The producer processor 128A also reads and extracts the last created/appended memory chunk ID (block 612). In the illustrated example, "memory chunk_2" (e.g., chunk 138B) is the current memory chunk (block 614).

Then, the producer processor 128A determines that the chunk ID (e.g., "chunk 1") form the producer sequence does not match the chunk ID from the last created/appended memory chunk (e.g., "chunk 2") (block 616). For example, the chunk ID from the producer sequence instead matches the chunk ID of "memory chunk_1", which is not the last created/appended memory chunk.

In the illustrated example, the producer processor 128A also determines that the chunk ID (e.g., "chunk 2") of the last created/appended memory chunk is greater than the extracted chunk ID (e.g., "chunk 1") (block 618). Because the chunk ID of the last created/appended memory chunk is greater than the extracted chunk ID, the producer processor 128A walks backward from "chunk 2" (e.g., chunk 138B) to "chunk 1" (e.g., chunk 138A) (block 620). Now, "memory chunk_1" is used for local write operations (block 622). For example, after walking backward from "chunk 2" to "chunk 1", "chunk 1" may be used to write the item into it. In an example, "chunk 2" may remain the current memory chunk (e.g., global current memory chunk for other producers).

Next, the producer processor 128A writes the item 626 into "slot 2" of "memory chunk_1" (block 624). The item 626 may be a packet address or a message and may be written into "slot 2" by the producer thread 160. The memory 124A or memory pool has the packet address associated with the offer request written into "slot 2" of "memory chunk_1" (block 628).

After the item 626 is written into a slot, the consumer processor 124A determines that the newly produced item 626 (e.g., packet address) is produced in "slot 2" (block 630). Then, the consumer processor 124A consumes the packet address (block 632). The consumer processor 124B or consumer thread 150 may determine that the item was produced at the slot position by using an item indicator. After determining that the item was newly produced, the consumer processor 124B or consumer thread 150 may consume the item (e.g., read and copy the packet address). After consuming the item, the consumer thread 150 may overwrite the slot with a NULL value to indicate that the slot is empty.

Continuing on FIG. 6B, the producer processor 128A may receive another offer request to produce an item (e.g., a packet address) (block 634). After receiving the offer request, the producer processor 128A increases a producer sequence (block 636), similar to block 608. Then, the producer processor 128A extracts a chunk ID (e.g., "chunk 1") and a position (e.g., "slot 3") from the producer sequence (block 638), similar to block 610. The producer processor 128A also reads and extracts the last created/appended memory chunk (block 640). In the illustrated example, "memory chunk_2" (e.g., chunk 138B) is the last created/appended memory chunk (block 642).

Then, the producer processor 128A determines that the chunk ID (e.g., "chunk 2") form the producer sequence matches the chunk ID from the last created memory chunk (e.g., "chunk 2") (block 644). After determining that the chunk ID from the last created/appended memory chunk (e.g., "chunk 2") matches the extracted chunk ID (e.g., "chunk 2") from the offer request, the producer processor 128A writes the item 648 into "slot 3" of "memory chunk 2" (e.g., chunk 138B) (block 646).

The memory 124A or memory pool has the packet address associated with the offer request written into "slot 3" of "memory chunk_2" (block 650). After the item 648 is written into a slot, the consumer processor 124A determines that the newly produced item 648 (e.g., packet address) is produced in "slot 3" (block 652), similar to block 630. Then, the consumer processor 124A consumes the packet address (block 654), similar to block 632.

Additionally, the consumer processor 124A determines that "slot 3" is the end slot of "memory chunk 2" (block 656). The consumer processor 124A or consumer thread 150 may continue to consume items in a memory chunk until it reaches the end slot, which indicates that each of the items in "memory chunk 2" are consumed. In an example, the consumer processor 124A or consumer thread 150 may periodically poll the memory chunk to determine if the memory chunk is empty, which advantageously allows the consumer thread 150 to recognize when the memory chunk or pool of memory chunks (e.g., pool or doubly linked list of memory chunks forming the unbounded queue) is empty.

Because "slot 3" is the end slot, the consumer processor 124A detaches "memory chunk 2" from the pool of memory chunks (block 658). Once "memory chunk 2" is detached, it may be recycled for re-use so that the producer processor 128 can produce future items to the memory chunk. For example, the detached memory chunk may be appended to the end of the current memory chunk by the producer processor 128A if the producer processor 128A reaches the end of the queue.

When the producer processor 128A reaches the end of a memory chunk (e.g., memory chunk_2), the producer processor 128A may decide to append a new memory chunk (block 660). In the illustrated example, the producer processor 128 reads the last created/appended memory chunk ID (block 662), similar to block 640. Then, the producer processor 128A sets the append bit/flag to true (block 664). For example, the producer processor 128A may set the append bit/flag to a value of "1" to indicate that an appending process is in progress. Then, the producer processor 128A may append a new memory chunk (e.g., "memory chunk_3") (block 666). Now, the memory 134A or memory pool includes "memory chunk_1", "memory chunk_2", and "memory chunk_3" (e.g., memory chunk 138C) with three slots (block 668). After finishing the append process, the producer processor 128A unsets the append bit/flag (block 670). For example, the producer processor 128A may set the bit/flag to false or set the flag back to "0." As noted above, by setting and unsetting the flag, the producer processor 128A may signal to other producer processors or threads when a new memory chunk is being appended so those processors or threads can wait or walk back to a previous memory chunk to prevent faults, errors or crashes.

In an alternative example, an index (e.g., the last created/appended memory chunk ID) may be incremented forward by one (1) when an appending process is initiated and then may be again incremented forward by one (1) when the appending process is complete. By incrementing the index forward by two (2) from start to end, the index may be later divided by two (2) to indicate whether an appending process is in progress, which may indicate that accessing the memory chunk is unsafe. For example, the producer processor 128A may read the last created/appended memory chunk ID at block 662, increase the chunk ID by (1) at block 664, and after appending the chunk, increase the chunk ID again by (1) (e.g., for a total increase of (2)) at block 670. Any of the producer processors 128 may divide the current value of the index to determine if the index has an odd value. If the value is odd, then another producer is currently appending a new memory chunk, which may indicate that accessing a memory chunk is unsafe (e.g., may cause an error, fault or ultimately a system crash).

Figure 7:
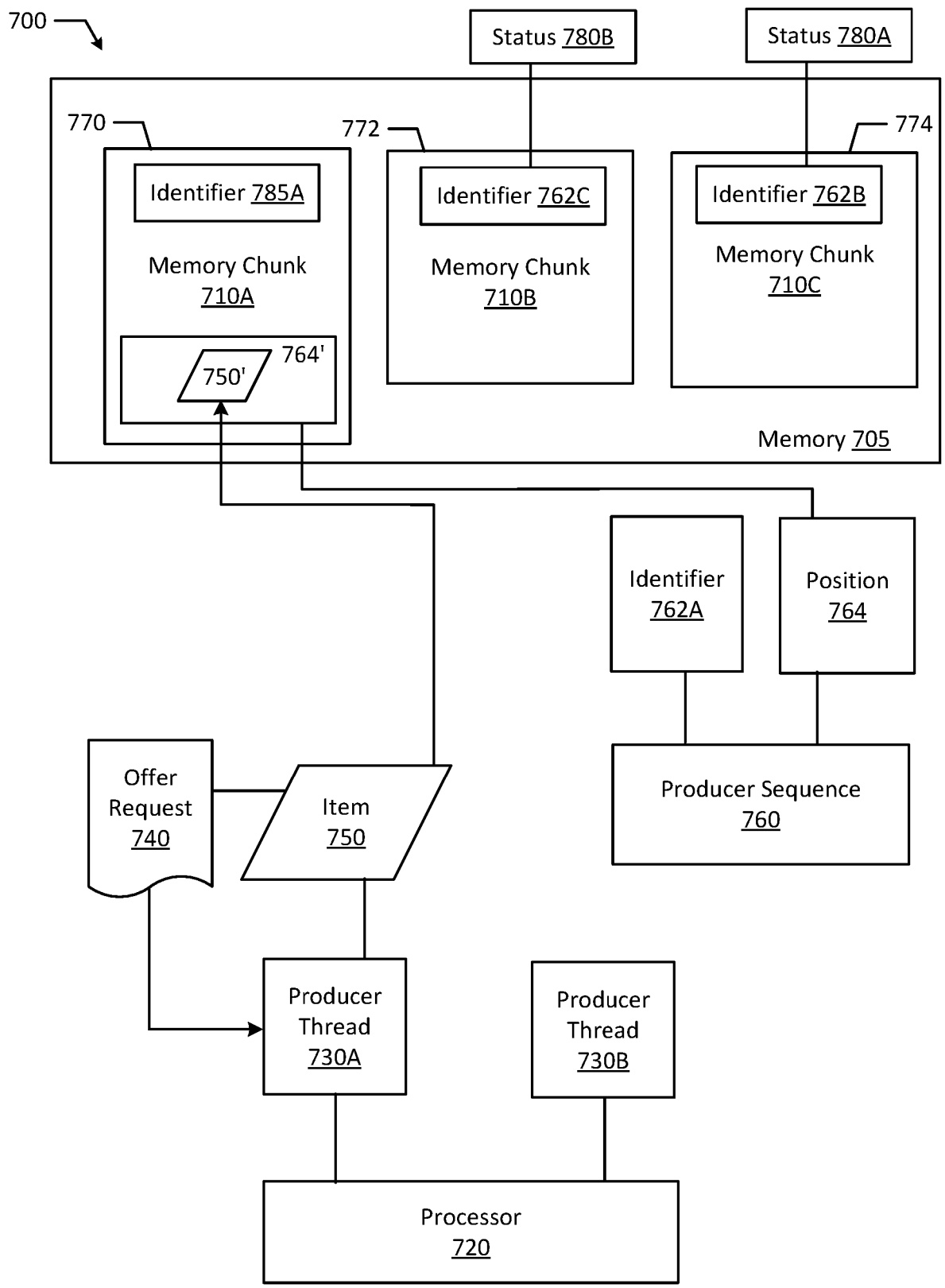
FIG. 7 illustrates a block diagram of an example progressive chunked queue system according to an example embodiment of the present disclosure.

FIG. 7 is a block diagram of an example progressive chunked queue system 700 for processing offer request(s) 740 according to an example embodiment of the present disclosure. The progressive chunked queue system 700 includes a memory 705 configured to store a plurality of memory chunks 710A-C and a processor 720 configured to execute a plurality of producer threads 730A-B. A producer thread 730A of the plurality of producer threads 730A-B is configured to increase a producer sequence 760 and determine (i) a first chunk identifier 762A (e.g., chunk ID), associated with the producer sequence 760, of an identified memory chunk 770 from the plurality of memory chunks 710A-C and (ii) a position 764, from the producer sequence 760, in the identified memory chunk 770 (e.g., expected memory chunk) to offer an item 750. The producer thread 730A is also configured to determine a second chunk identifier 762B of a last created/appended memory chunk 774 and determine a first status 780A of the second chunk identifier 762B as one of valid or invalid. The second chunk identifier 762B is valid if the second chunk identifier 762B matches the first chunk identifier 762A. Responsive to determining the first status 780A as valid, the producer thread 730A is configured to read a current memory chunk 772. Additionally, the producer thread 730A is configured to determine a second status 780B of a third chunk identifier 762C associated with the current memory chunk 772 as one of valid or invalid. The third chunk identifier 762C is valid if the third chunk identifier 762C matches the first chunk identifier 762B. Responsive to determining the second status 780B of the third chunk identifier as valid, the producer thread 730A is configured to write the item 750' into the identified memory chunk 770 at the position 764' (note that the item 750 is illustrated as item 750' and the position 764 is illustrated as 764' after the item 750' is written into the position 764' of the identified memory chunk 770).

Unlike other systems that use a single linked-list, for example a linked-list for concurrent ring queues ("CRQ"), the progressive chunked queue system 700 may use a double linked-list of chunks. For example, a producer processor or producer thread 730B that is lagging behind may advantageously keep-up by reaching the chunk of memory (e.g., memory chunk 710B) that will host that producer processor's "yet-to-be-offered" items. For example, the producer processor or producer thread may use the previous pointer from the last observed tail to navigate to the current chunk of memory (e.g., current memory chunk 772 or memory chunk 710B). Specifically, the moment at which a producer sequence 760 is incremented, another producer (e.g., producer thread 730B) can move forward and the producer threads (e.g., producer threads 730A-B) have the ability to move or walk backwards to reach previous slots (e.g., slot identified by position 764 in memory chunk 710A).

The double linked-list of chunks advantageously involves less coordination between producer processors or producer threads (e.g., producer thread 730A-B) in order to remain in the appropriate memory chunk. For example, instead of each processor thread performing a CAS instruction, each of the processor threads (e.g., producer thread 730A-B) cooperate to reach an objective instead of competing. Additionally, using a double linked-list of chunks allows the disclosed systems and methods to use a single producer sequence 760 (instead of a producer sequence for each CRQ as with previous techniques), which makes it possible to monitor and observe the size of the queue and recognize when the queue is empty. Furthermore, the second chunk identifier 762B of a last created/appended memory chunk 774 or a corresponding append bit/flag may be used to ensure that the producer threads (e.g., producer thread 730A-B) are safely accessing memory chunks. If the second chunk identifier 762B of a last created/appended memory chunk 774 or a corresponding append bit/flag indicates that an appending process is in progress, the producer threads (e.g., producer thread 730A-B) may wait before accessing a memory chunk to prevent faults, errors or crashes.

It will be appreciated that all of the disclosed methods and procedures described herein can be implemented using one or more computer programs or components. These components may be provided as a series of computer instructions on any conventional computer readable medium or machine-readable medium, including volatile or non-volatile memory, such as RAM, ROM, flash memory, magnetic or optical disks, optical memory, or other storage media. The instructions may be provided as software or firmware, and/or may be implemented in whole or in part in hardware components such as ASICs, FPGAs, DSPs or any other similar devices. The instructions may be configured to be executed by one or more processors, which when executing the series of computer instructions, performs or facilitates the performance of all or part of the disclosed methods and procedures.

It should be understood that various changes and modifications to the example embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A system comprising:
a memory comprising a plurality of memory chunks, wherein a memory chunk is a grouping of data stored in the memory; and
a processor configured to execute a plurality of producer threads, wherein a producer thread of the plurality of producer threads is configured to:
receive an offer request for an item to be produced, wherein the offer request comprises a request for an item to be stored in a memory chunk and an item comprises data;
increase a value of a counter of a producer sequence, wherein the producer sequence includes a first chunk identifier that identifies a memory chunk, from the plurality of memory chunks, for the offer request and a position that identifies a slot for producing the item;
extract, from the producer sequence, the first chunk identifier and the position in the identified memory chunk to offer the item;
extract, from a producer chunk index, a second chunk identifier of a last created/appended memory chunk;
determine a first status of the second chunk identifier as one of valid or invalid, wherein the second chunk identifier is valid if the second chunk identifier matches the first chunk identifier;
responsive to determining the first status as valid, read a current memory chunk, wherein the current memory chunk is at a location referenced by a pointer that determines where the producer thread offers items;
determine a second status of a third chunk identifier read from the current memory chunk as one of valid or invalid, wherein the third chunk identifier is valid if the third chunk identifier matches the first chunk identifier; and
responsive to determining the second status of the third chunk identifier as valid, write the item into the identified memory chunk at the position.

2. The system of claim 1, wherein the producer thread is further configured to:
receive the offer request associated with the item, and
responsive to receiving the offer request, increase the producer sequence.

3. The system of claim 1, wherein the producer thread is further configured to:
responsive to determining the first status or the second status as invalid, attempt to append a new memory chunk, wherein the new memory chunk is one of a newly allocated memory chunk and a reused pooled memory chunk.

4. The system of claim 1, wherein the first identifier is a memory chunk identifier.

5. The system of claim 1, wherein the identified memory chunk includes a plurality of slots, and wherein the plurality of slots is arranged in an array.

6. The system of claim 5, wherein the position is a slot of the plurality of slots, and wherein the producer sequence includes the counter that identifies the offer request.

7. The system of claim 1, wherein the identified memory chunk occupies at least two cache-lines.

8. The system of claim 1, wherein the second chunk identifier is a single memory location that contains a numerical identifier and an append flag/bit.

9. The system of claim 8, wherein the append flag/bit is set if a chunk appending operation is in progress.

10. A method comprising:
receiving an offer request for an item to be produced;
increasing, by a producer thread, a value of a counter of a producer sequence, wherein the producer sequence includes a first chunk identifier that identifies a memory chunk, from the plurality of memory chunks, for the offer request and a position that identifies a slot for producing the item, and wherein a memory chunk is a grouping of data stored in a memory;
extracting, by the producer thread, from the producer sequence, the first chunk identifier and the position in the identified memory chunk to offer the item;
extracting, by the producer thread, from a producer chunk index, a second chunk identifier of a last created/appended memory chunk;
determining, by the producer thread, a first status of the second chunk identifier as one of valid or invalid, wherein the second chunk identifier is valid if the second chunk identifier matches the first chunk identifier;

responsive to determining the first status as valid, reading, by the producer thread, a current memory chunk, wherein the current memory chunk is at a location referenced by a pointer that determines where the producer thread offers items;

determining, by the producer thread, a second status of a third chunk identifier read from the current memory chunk as one of valid or invalid, wherein the third chunk identifier is valid if the third chunk identifier matches the first chunk identifier; and responsive to determining the second status of the third chunk identifier as valid, writing, by the producer thread, the item into the identified memory chunk at the position.

11. The method of claim 10, further comprising:
receiving, by a producer thread of a plurality of producer threads, an offer request associated with an item; and
responsive to receiving the offer request, increasing the producer sequence.

12. The method of claim 10, further comprising:
responsive to determining the first status or the second status as invalid, searching, by the producer thread, for another memory chunk.

13. The method of claim 10, wherein searching for the new memory chunk includes:
extracting an append bit/flag from the second chunk identifier;
determining a third status of the second chunk identifier as one of greater than or equal to the first chunk identifier or less than the first chunk identifier;
responsive to determining the third status as greater than or equal to the first chunk identifier, reading the current memory chunk and walking backwards from the current memory chunk to the identified memory chunk; and
responsive to determining the third status as, determining if the append bit/flag is unset.

14. The method of claim 13, further comprising:
responsive to determining that the append bit/flag unset, trying to append a new memory chunk.

15. The method of claim 14, wherein trying to append the new memory chunk includes:
setting the append bit/flag in the second chunk identifier;
appending the new memory chunk to the current memory chunk; and
increase the second chunk identifier by a predetermined value.

16. The method of claim 15, wherein the predetermined value is a sum of a first value and a second value, the method further comprising:
increasing the second chunk identifier by the first value when starting to append the new memory chunk; and
increasing the second chunk identifier by the second value when finished appending the new memory chunk.

17. The method of claim 16, wherein the first value and the second value are the same integer value resulting in an even predetermined value, and wherein an odd chunk identifier indicates that appending the new memory chunk is incomplete.

18. The method of claim 15, further comprising:
unsetting, by the producer processor, the append bit/flag.

19. The method of claim 10, further comprising consuming, by a consumer thread, the item from the identified memory chunk.

20. A non-transitory machine readable medium storing code, which when executed by at least one processor, causes a producer thread of a plurality of producer threads to:
receive an offer request for an item to be produced;
increase a value of a counter of a producer sequence, wherein the producer sequence includes a first chunk identifier that identifies a memory chunk, from the plurality of memory chunks, for the offer request and a position that identifies a slot for producing the item, and wherein a memory chunk is a grouping of data stored in a memory;
extract, from the producer sequence, the a first chunk identifier and the position in the identified memory chunk to offer the item;
extract, from a producer chunk index, a second chunk identifier of a last created/appended memory chunk;
determine a first status of the second chunk identifier as one of valid or invalid, wherein the second chunk identifier is valid if the second chunk identifier matches the first chunk identifier;
responsive to determining the first status as valid, read a current memory chunk, wherein the current memory chunk is a chunk that is at a location referenced by a pointer that determines where the producer thread offers items;
determine a second status of a third chunk identifier read from the current memory chunk as one of valid or invalid, wherein the third chunk identifier is valid if the third chunk identifier matches the first chunk identifier; and
responsive to determining the second status of the third chunk identifier as valid, write by the producer thread, the item into the identified memory chunk at the position.

* * * * *